(12) United States Patent
Matsunaga

(10) Patent No.: US 11,541,879 B2
(45) Date of Patent: Jan. 3, 2023

(54) VEHICLE CONTROL APPARATUS

(71) Applicant: TOYOTA JIDOSHA KABUSHIKI KAISHA, Toyota (JP)

(72) Inventor: Issei Matsunaga, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 16/837,971

(22) Filed: Apr. 1, 2020

(65) Prior Publication Data

US 2020/0317189 A1  Oct. 8, 2020

(30) Foreign Application Priority Data

Apr. 2, 2019  (JP) ............................. JP2019-070401

(51) Int. Cl.
  *B60W 30/06*  (2006.01)
  *G05D 1/02*  (2020.01)
  *G08G 1/14*  (2006.01)

(52) U.S. Cl.
  CPC ........... *B60W 30/06* (2013.01); *G05D 1/0212* (2013.01); *G08G 1/14* (2013.01); *G05D 2201/0213* (2013.01)

(58) Field of Classification Search
  CPC ........ B60W 30/06; G05D 1/0212; G08G 1/14
  USPC .......................................................... 701/25
  See application file for complete search history.

(56) References Cited

U.S. PATENT DOCUMENTS

| 7,969,326 | B2 * | 6/2011 | Sakakibara | ........ B62D 15/0275 340/932.2 |
| 10,831,195 | B2 * | 11/2020 | Ito | ........................ G05D 1/0287 |
| 2007/0021881 | A1 * | 1/2007 | Mori | ..................... B60Q 9/005 701/28 |
| 2007/0097209 | A1 * | 5/2007 | Kubota | .............. B62D 15/0275 382/104 |

FOREIGN PATENT DOCUMENTS

| JP | 2007-124226 A | 5/2007 |
| JP | 2014227021 A | 12/2014 |
| JP | 2015-214222 A | 12/2015 |
| JP | 2016134710 A | 7/2016 |
| JP | 2018-184140 A | 11/2018 |
| WO | 2016013574 A1 | 1/2016 |

* cited by examiner

*Primary Examiner* — Peter D Nolan
*Assistant Examiner* — Luke Huynh
(74) *Attorney, Agent, or Firm* — Hunton Andrews Kurth LLP

(57) ABSTRACT

A vehicle control apparatus is configured to perform a stop control for stopping a vehicle at a target stop position. The vehicle control apparatus is provided with: a first executor configured to perform a first stop control as the stop control such that a first vehicle is stopped at a first target stop position, which is the target stop position; a second executor configured to perform a second stop control as the stop control such that a second vehicle is stopped at a second target stop position after obtaining a difference between the first target stop position and a first actual stop position at which the vehicle is stopped in the first stop control; and a corrector configured to correct control contents of the second stop control on the basis of the difference, before the second vehicle is stopped at the second target stop position.

3 Claims, 8 Drawing Sheets ial Field

Embodiments of the present disclosure relate to a vehicle control apparatus configured to perform a stop control of a vehicle.

2. Description of the Related Art

For this type of apparatus, there is known an apparatus configured to perform a control for stopping a vehicle at a target position (hereinafter referred to a "stop control" as occasion demands). For example, Japanese Patent Application Laid Open No. 2018-184140 (Patent Literature 1) discloses a technology/technique of parking a vehicle at a target parking position by automated or autonomous driving.

For another related technology/technique, Japanese Patent Application Laid Open No. 2015-214222 (Patent Literature 2) discloses a technology/technique of storing a reverse start position at which a vehicle starts to be reversed to a parking area and of superimposing the stored reverse start position on an overhead image in subsequent parking. Japanese Patent Application Laid Open No. 2007-124226 (Patent Literature 3) discloses a technology/technique of superimposing an image of the past on a current captured image on the basis of history data in manual parking of the past and of compensating a dead space or blind spot of the captured image.

In a stop control of a vehicle, in some cases, an unexpected deviation of position (i.e., a deviation between a target stop position of the stop control and a position at which the vehicle is actually stopped) may be generated for various reasons. In particular, if the stop control is performed in similar environments, the similar deviation of the position may be easily repeatedly generated. The deviation of the position in the stop control may influence not only a host vehicle (i.e., a vehicle that performs the stop control) but also other vehicles (i.e., vehicles other than the vehicle that performs the stop control). Specifically, the host vehicle that is stopped with a deviation from the target stop position may interfere with traffic of the other vehicles. Thus, even a slight deviation of the position may have an extremely big influence.

SUMMARY

In view of the aforementioned problem, it is therefore an object of embodiments of the present disclosure to provide a vehicle control apparatus that can perform a stop control of a vehicle, on the basis of information of the past.

An aspect of a vehicle control apparatus according to the present disclosure is a vehicle control apparatus configured to perform a stop control for stopping a vehicle at a target stop position to stop, the vehicle control apparatus provided with: a first executor configured to perform a first stop control as the stop control such that a first vehicle, which is the vehicle, is stopped at a first target stop position, which is the target stop position; a second executor configured to perform a second stop control as the stop control such that a second vehicle, which is the vehicle, is stopped at a second target stop position, which is the target stop position, after obtaining a difference between the first target stop position and a first actual stop position at which the vehicle is stopped in the first stop control; and a corrector configured to correct control contents of the second stop control on the basis of the difference, before the second vehicle is stopped at the second target stop position.

DETAILED DESCRIPTION OF THE EMBODIMENT

Hereinafter, a vehicle control apparatus according to an embodiment of the present disclosure will be explained with reference to the drawings.

Configuration of Apparatus

Figure 1:
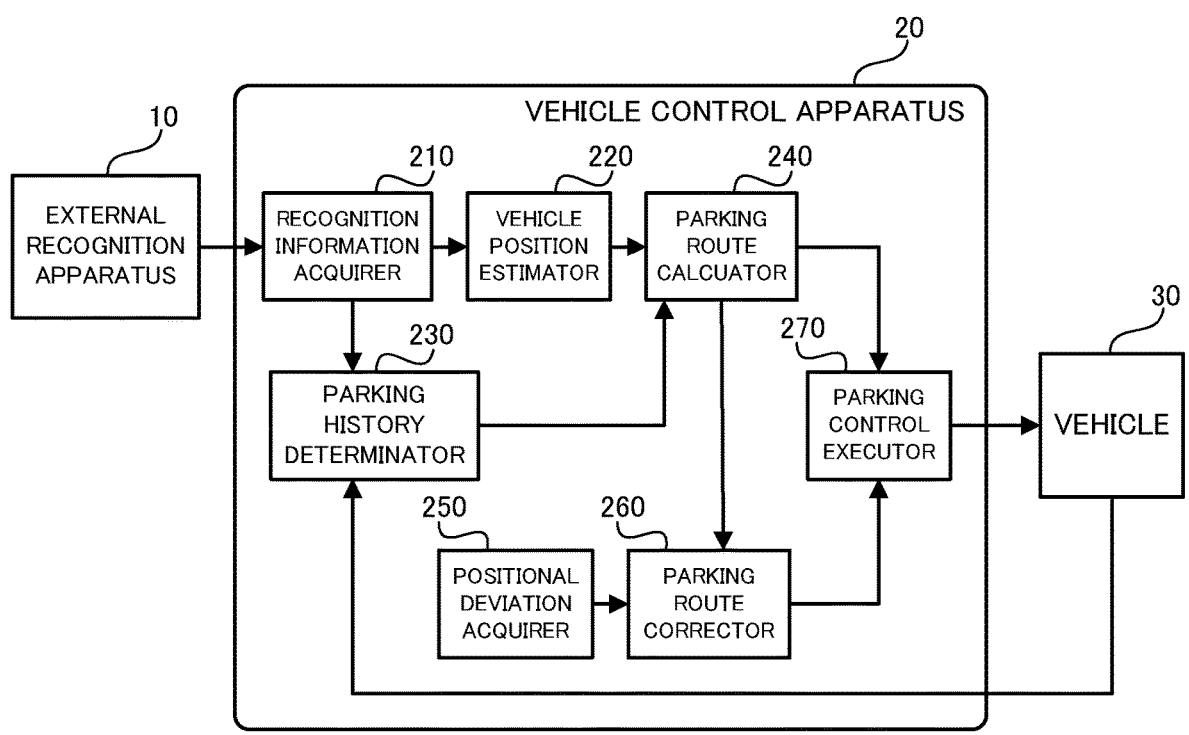
FIG. 1 is a block diagram illustrating a configuration of a vehicle control apparatus according to an embodiment.

Firstly, a configuration of the vehicle control apparatus according to the embodiment will be explained with reference to FIG. 1. FIG. 1 is a block diagram illustrating the configuration of the vehicle control apparatus according to the embodiment.

In FIG. 1, a vehicle control apparatus 20 according to the embodiment may be an apparatus applied to a parking lot that allows an automatic parking control (or so-called automated valet parking), and is configured, for example, as a part of a management or administrative server of the parking lot. The vehicle control apparatus 20 is configured to perform an automatic parking control of a vehicle 30, by using recognition information obtained from an external recognition apparatus 10, which includes, for example, a camera. The vehicle control apparatus 20 is provided with a recognition information acquirer 210, a vehicle position estimator 220, a parking history determinator 230, a parking route calculator 240, a positional deviation acquirer 250, a parking route corrector 260, and a parking control executor 270, as logical processing blocks or physical processing circuits for realizing functions of the vehicle control apparatus 20.

The recognition information acquirer 210 is configured to obtain recognition information of a vehicle 30 (hereinafter referred to as an "automatic parking vehicle" as occasion demands), which is a target of the automatic parking control, from the external recognition apparatus 10. The recognition information may include, for example, information about a position and a posture of the vehicle 30, and specific information for identifying a type of the vehicle 30, a size, a mounting system or the like. The recognition information obtained by the recognition information acquirer 210 may be outputted to each of the vehicle position estimator 220 and the parking history determinator 230.

The vehicle position estimator 220 is configured to estimate a current position of the automatic parking vehicle, on the basis of the recognition information obtained by the recognition information acquirer 210. An estimation result of the vehicle position estimator 220 may be outputted to the parking route calculator 240.

The parking history determinator 230 is configured to determine whether or not a vehicle of the same type as the automatic parking vehicle (which is specifically a vehicle whose specific information matches that of the automatic parking vehicle) has performed the automatic parking control in the past, on the basis of the specific information obtained by the recognition information acquirer 210. Moreover, the parking history determinator 230 is configured to determine whether or not a parking frame in which the automatic parking vehicle will be parked from now (i.e., a parking frame that is a target position of the automatic parking) is the same as or of the same type as a parking frame in which the automatic parking has been performed in the past, on the basis of past data obtained from the automatic parking vehicle (i.e., history information about the automatic parking of the past). A specific determination method by the parking history determinator 230 will be explained in detail later. A determination result of the parking history determinator 230 may be outputted to the parking route calculator 240.

The parking route calculator 240 is configured to calculate a driving route associated with the automatic parking control (hereinafter referred to as a "parking route" as occasion demands), on the basis of the current position of the automatic parking vehicle estimated by the vehicle position estimator 220. A detailed explanation of a specific method of calculating the driving route by the parking route calculator 240 will be omitted herein because the existing technologies/techniques can be applied to the method as occasion demands. The parking route calculated by the parking route calculator 240 may be outputted basically to the parking control executor 270, but may be outputted to the parking route corrector 260, as occasion demands, in accordance with the determination result of the parking history determinator 230.

The positional deviation acquirer 250 is configured to obtain information about a deviation of position when the parking is completed in the automatic parking control in the past. The positional deviation acquirer 250 may obtain a difference between a target position of the automatic parking control and a position of the vehicle 30 when the automatic parking control is ended, as positional deviation information indicating the deviation of the position. The positional deviation acquirer 250 may store the obtained positional deviation information, in a state in which the positional deviation information can be read by the parking route corrector 260 as occasion demands.

The parking route corrector 260 is configured to correct the parking route calculated by the parking route calculator 240, on the basis of the positional deviation information read from the positional deviation acquirer 250 (i.e., the information about the deviation of the position that has been generated in the automatic parking control in the past). Specifically, the parking route corrector 260 may correct the parking route so as to reduce the deviation of the position when the current automatic parking control is completed, on the basis of the positional deviation information of the past. The parking route corrector 260 may correct the parking route indirectly by changing the target position of the automatic parking control. Alternatively, the parking route corrector 260 may change control contents of the control for stopping the vehicle 30 at the target position, by changing a parameter other than the target position or the parking route. The parking route corrector 260 is a specific example of the "corrector" in Supplementary Notes described later.

The parking control executor 270 is configured to perform the automatic parking control of the automatic parking vehicle, by controlling the driving or travel of the vehicle 30. More specifically, the parking control executor 270 may perform an automatic driving control of the automatic parking vehicle, by instructing the automatic parking vehicle to control an accelerator actuator, a brake actuator, a steering actuator, or the like. A more detailed explanation of the automatic parking control will be omitted herein because the existing technologies/techniques can be applied to the automatic parking control as occasion demands. The parking control executor 270 is a specific example of the "first executor" and the "second executor" in Supplementary Notes described later.

Each of the constituents provided for the vehicle control apparatus 20 described above may be also provided, at least partially, for the external recognition apparatus 10 and the vehicle 30, or another external apparatus. For example, each of the constituents provided for the vehicle control apparatus 20 described above may be also partially or all provided for the vehicle 30. In other words, the vehicle control apparatus 20 may be an apparatus mounted on a vehicle. Each of functions of the vehicle control apparatus 20 described above may not be provided for only one apparatus, but may be distributed to a plurality of apparatuses. Specifically, the vehicle 30 and each of apparatuses outside the vehicle 30 may constitute a system that can perform the same operation as that of the vehicle control apparatus 20.

Overall Operation

Figure 2:
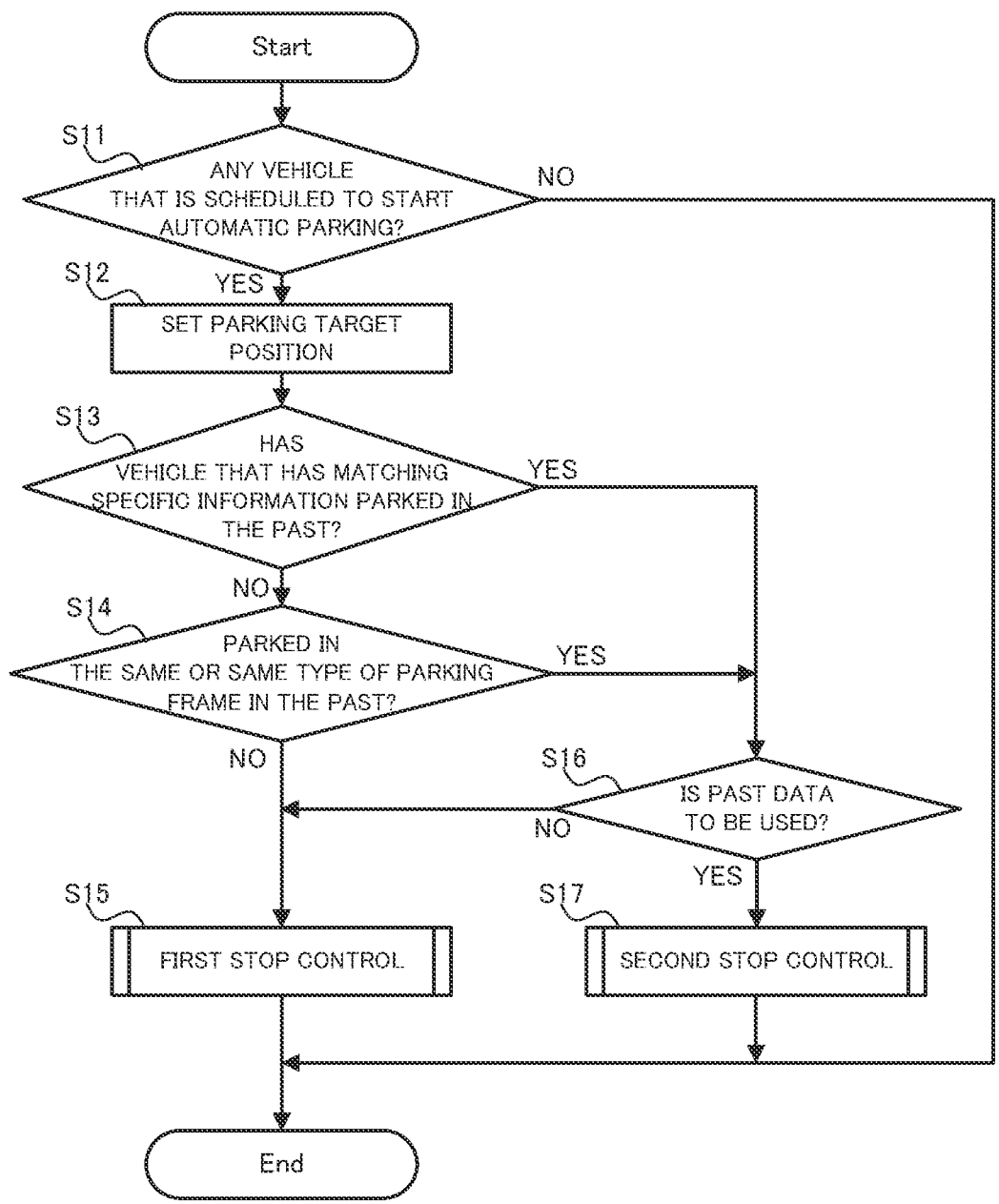
FIG. 2 is a flowchart illustrating a flow of operations of the vehicle control apparatus according to the embodiment.

Next, a flow of overall operation of the vehicle control apparatus 20 according to the embodiment will be explained with reference to FIG. 2. FIG. 2 is a flowchart illustrating a flow of operations of the vehicle control apparatus according to the embodiment.

As illustrated in FIG. 2, the vehicle control apparatus 20 according to the embodiment firstly determines whether or not there is a vehicle 30 that is scheduled to start the automatic parking control (i.e., an automatic parking vehicle) (step S11). This determination can be realized, for example, by detecting whether or not there is a vehicle that has a parking reservation near an entrance of a parking lot, near a start position of the automatic parking, or the like. If it is determined that there is no automatic parking vehicle (the step S11: NO), the subsequent process is omitted, and a series of steps is ended. In this case, the step S101 may be performed after a lapse of a predetermined period.

If it is determined that there is an automatic parking vehicle (the step S11: YES), the vehicle control apparatus 20 sets a parking target position of the automatic parking vehicle (i.e., a target position of the automatic parking control) (step S12). The parking target position may be automatically selected, for example, from parking frames that are vacant at a current time point.

The vehicle control apparatus 20 then determines whether or not the automatic parking control has been performed in the past on a vehicle whose specific information matches that of the automatic parking vehicle (step S13). Specifically, the parking history determinator 230 may determine whether or not history data on the automatic parking of the past includes any data of a vehicle whose specific information matches that of the automatic parking vehicle. The parking history determinator 230 herein may function as a specific example of the "specific information acquirer" in Supplementary Notes described later.

The specific information may be data on features that could influence the deviation of the position during the automatic parking control (which is, more specifically, data from which it can be predicted that the same deviation of the position will be generated in the case of matching specific information). For example, if individual identification information of a vehicle (e.g., information about a chassis number and a number plate) is used as the specific information, it can be determined that the same vehicle has been parked in the past. In the case of the same vehicle, it can be predicted that the same deviation of the position as that of the past will be generated in the automatic parking control. Moreover, in the case of a vehicle that is not the same but that has a matching vehicle type and size, then, it can be predicted that the same deviation of the position is likely generated in the automatic parking control. In this case, information about at least one of the vehicle type and the size may be used as the specific information. Moreover, in the case of a matching system (e.g., a position acquisition system, etc.) mounted on a vehicle, it can be predicted that the same deviation of the position is also likely generated in the automatic parking control. In this case, information about the system mounted on the vehicle may be used as the specific information.

If it is determined that a vehicle whose specific information matches that of the automatic parking vehicle has not been parked in the past (the step S13: NO), the vehicle control apparatus 20 determines whether or not the automatic parking vehicle has been automatically parked in the same parking frame or the same type of parking frame that is the parking target position (step S14). Specifically, the parking history determinator 230 may determine whether or not the history data of the past stored by the automatic parking vehicle includes data about parking into a parking frame located at the same position as the parking frame that is set as the current parking target position (i.e., the same parking frame), or into a parking frame that has the same shape or the same parking mode (i.e., the same type of parking frame). The parking history determinator 230 herein may function as a specific example of the "parking mode acquirer" in Supplementary Notes described later.

Figure 3:
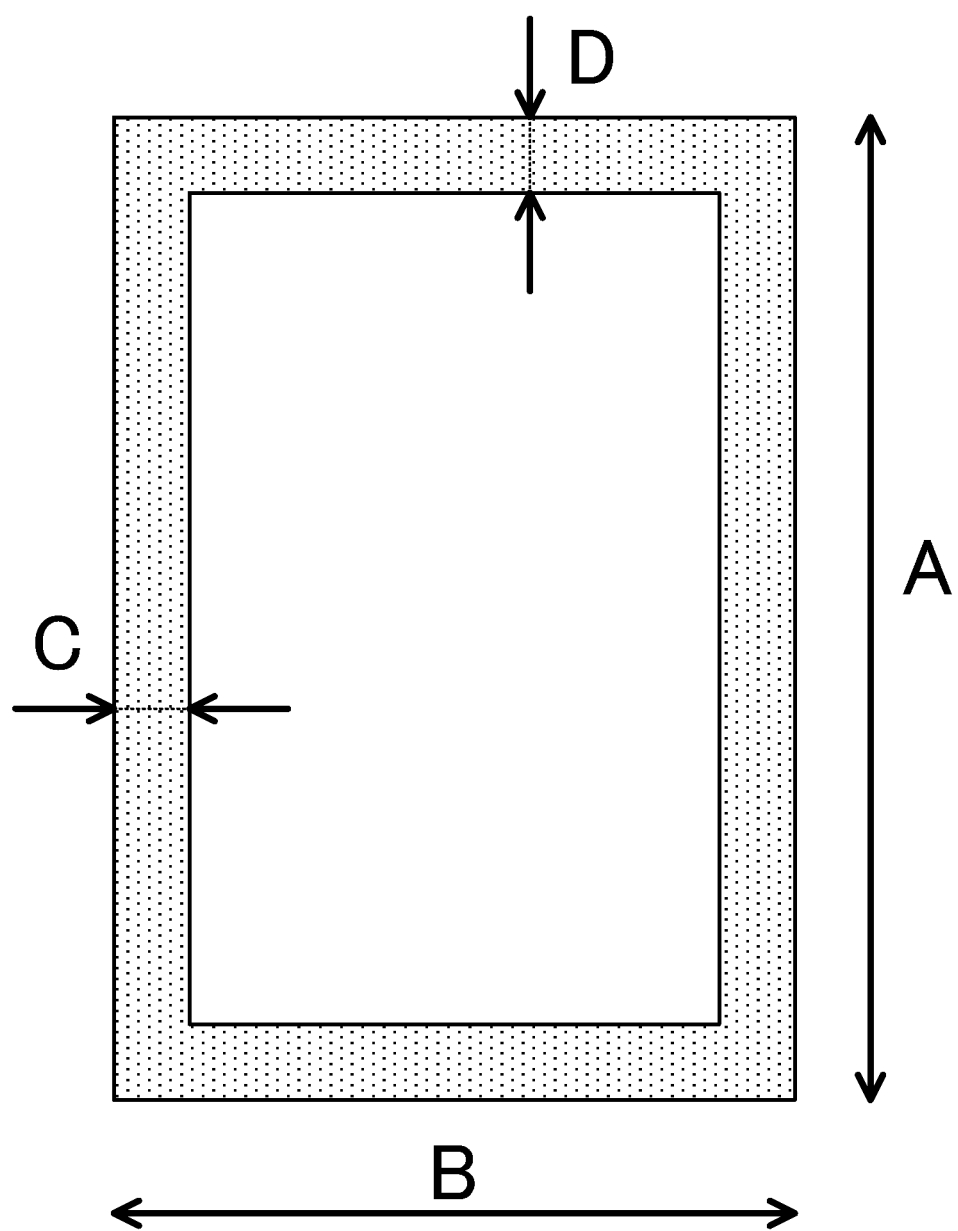
FIG. 3 is a schematic diagram illustrating an example of a method of determining a type of a parking frame.
Figure 4A:
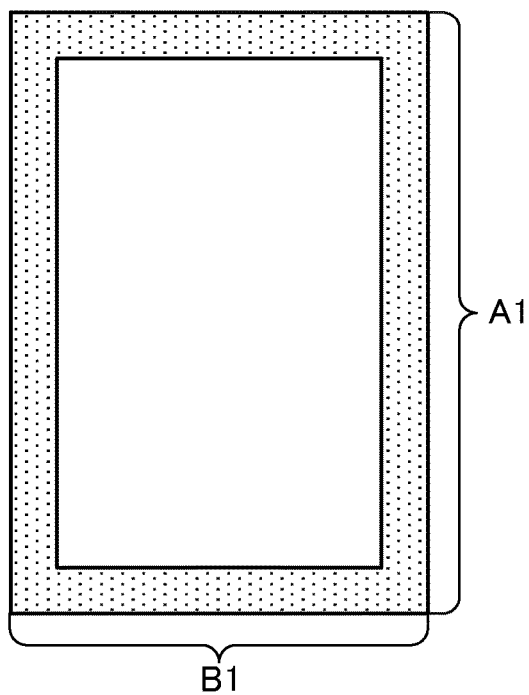
FIG. 4A is a schematic diagram illustrating an example of a specific parking frame.
Figure 4B:
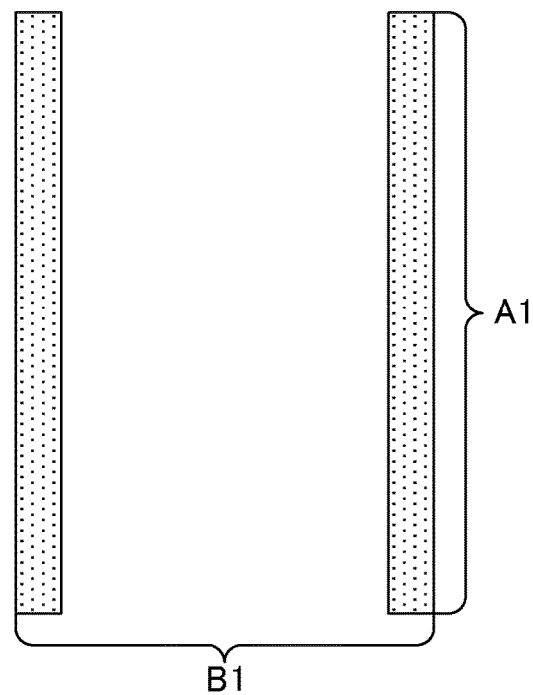
FIG. 4B is a schematic diagram illustrating an example of the specific parking frame.
Figure 5:
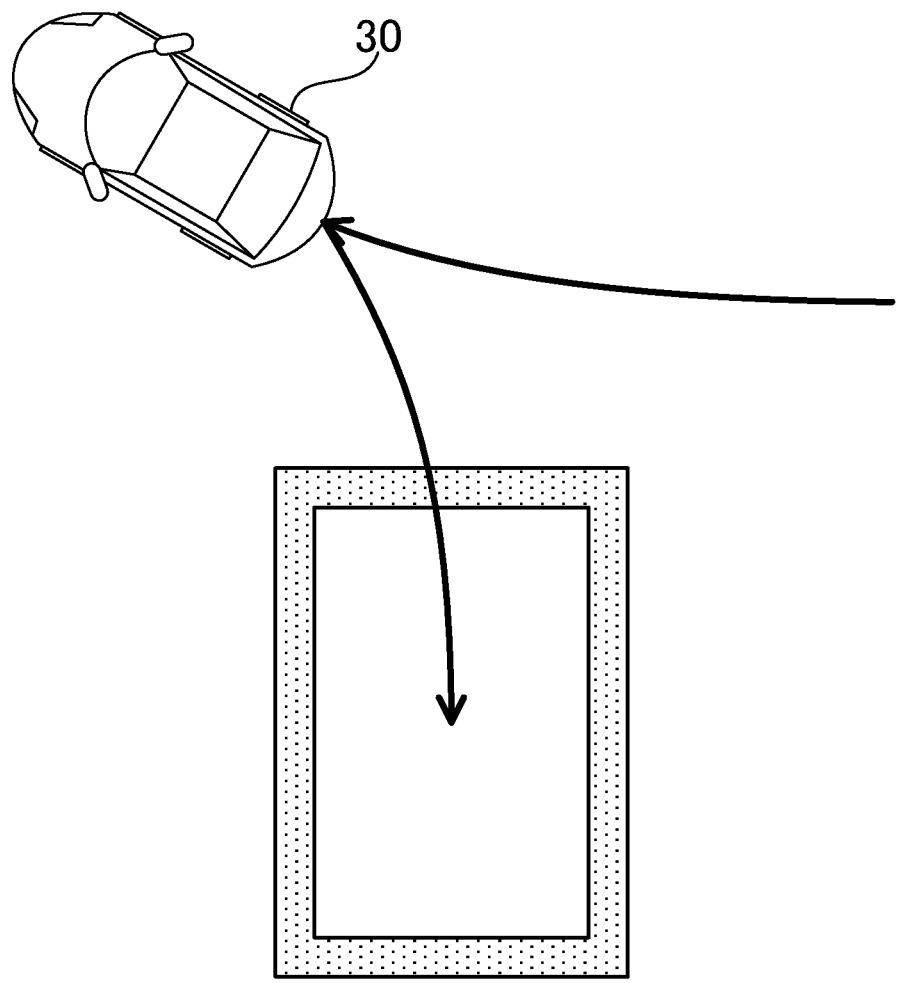
FIG. 5 is a schematic diagram illustrating an example of a method of determining a parking mode of the parking frame.

Now, a determination method regarding the same type of parking frame (i.e., a method of determining whether or not shapes of parking frames or parking modes match) will be specifically explained with reference to FIG. 3 to FIG. 5. FIG. 3 is a schematic diagram illustrating an example of a method of determining a type of a parking frame. FIG. 4A is a schematic diagram illustrating an example of a specific parking frame. FIG. 4B is a schematic diagram illustrating an example of the specific parking frame. FIG. 5 is a schematic diagram illustrating an example of a method of determining a parking mode of the parking frame.

As illustrated in FIG. 3, whether or not the shapes of parking frames match can be determined by using a length A of a long side of a parking frame and a length B of a short side. Specifically, if both the length A of the long side and the length B of the short side are the same or a difference in the lengths is extremely small between the parking frame included in the history data of the past and the parking frame that is the current parking target position, it may be determined that the shapes of the parking frames match. Alternatively, in addition to or instead of the length A of the long side and the length B of the short side described above, whether or not the shapes of the parking frames match may be determined by using a frame line width C of the long side of the parking frame and a frame line width D of the short side. In this case, if both the frame line width C and the frame line width D are the same or a difference in the frame line widths is extremely small between the parking frame included in the history data of the past and the parking frame that is the current parking target position, it may be determined that the shapes of the parking frames match.

A parking frame surrounded by frame lines on all sides illustrated in FIG. 4A and a parking frame surrounded by frame lines only on lateral sides illustrated in FIG. 4B may be determined to have the same shape, only in view of the length A of the long side of the parking frame and the length B of the short side. It is because a length A1 of the long side and a length B1 of the short side are the same between the two parking frames. On the other hand, the parking frame illustrated in FIG. 4A and the parking frame illustrated in FIG. 4B may be determined to have different shapes in view of the frame line width C of the long side of the parking frame and the frame line width D of the short side. It is because the frame line of the short side is different between the two parking frames (i.e., the parking frame illustrated in FIG. 4A has frame lines of the short side, but the parking frame illustrated in FIG. 4B does not have any frame lines of the short side).

As illustrated in FIG. 5, whether or not parking modes into a parking frame match can be determined on the basis of a direction of travel of the vehicle 30 when entering or leaving from the parking frame. For example, it is possible to determine whether or not the parking modes match, on the basis of information about whether the vehicle 30 goes forward or backward when entering the parking frame, or whether or not the vehicle 30 goes forward or backward when leaving from the parking frame. Moreover, it is also possible to determine whether or not the parking modes match, on the basis of more specific behaviors of the vehicle 30. In an example illustrated in FIG. 5, the vehicle 30 goes forward and passes by the short side of the parking frame and then enters the parking frame in reverse. In addition, there is also a mode in which the vehicle 30 goes forward and passes by the long side of the same parking frame and then enters the parking frame in reverse (e.g., refer to FIG. 8). As described above, whether or not the parking modes match may be determined not only in view of the direction of travel when entering the parking frame, but also in view of a direction of travel, a quick turn or turn back of a steering wheel immediately before entering, a direction of approaching the parking frame, and the like.

The determination method described above is merely an example, and the same type of parking frame may be also determined in a different method. For example, it is also possible to determine whether or not to be the same type of parking frame by using not only the size and shape of the parking frame, but also the position and size of an obstacle located near a parking lot, or the like.

Back in FIG. 2, if it is determined that the automatic parking vehicle has not been parked in the same parking frame or the same type of parking frame that is the parking target position (the step S14: NO), the vehicle control apparatus 20 performs a first stop control, which does not use the past data (step S15). On the other hand, if it is determined that a vehicle whose specific information matches that of the automatic parking vehicle has been parked in the past (the step S13: YES), or it is determined that the automatic parking vehicle has been parked in the same parking frame or the same type of parking frame that is the parking target position (the step S14: YES), the vehicle control apparatus 20 determines whether or not to use the past data (step S16). The determination herein can be realized, for example, by reading a value set by a user, and if it is set such that the user performs the automatic parking control by using the past data, then, it is determined that the past data is to be used (the step S16: YES). In this case, the vehicle control apparatus 20 performs a second stop control, which uses the past data (step S17). On the other hand, if it is set such that the user does not perform the automatic parking control by using the past data, then, it is determined that the past data is not to be used (the step S16: NO). In this case, the vehicle control apparatus 20 performs the first stop control, which does not use the past data (the step S15).

First Stop Control

Figure 6:
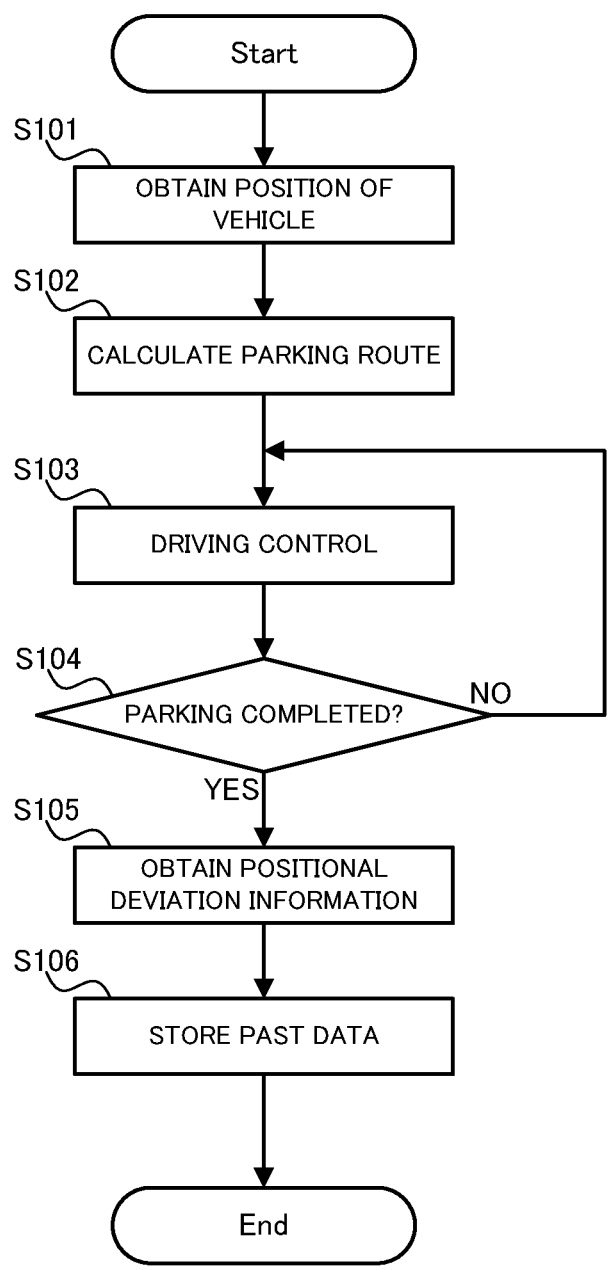
FIG. 6 is a flowchart illustrating a flow of operations of a first stop control.

Next, the first stop control (i.e., the step S15 in FIG. 2) will be specifically explained with reference to FIG. 6. FIG. 6 is a flowchart illustrating a flow of operations of the first stop control.

As illustrated in FIG. 6, when the first stop control is started, the parking route calculator 240 firstly obtains the current position of the vehicle 30 estimated by the vehicle position estimator 220 (step S101). The parking route calculator 240 then calculates a parking route from the current position of the vehicle 30 to the target parking position (step S102).

The parking control executor 270 then controls the driving of the vehicle 30, on the basis of the parking route calculated by the parking route calculator 240 (step S103). By this, the vehicle 30 moves to the target parking position.

When the driving control of the vehicle 30 is started, the parking control executor 270 determines whether or not the parking of the vehicle 30 is completed (i.e., whether or not the vehicle 30 has reached the target parking position) (step S104). If the parking is not completed (the step S104: NO), the parking control executor 270 continues the driving control of the vehicle 30.

If the parking of the vehicle 30 is completed (the step S104: YES), the positional deviation acquirer 250 obtains the positional deviation information (i.e., a difference between the parking target position and a position at which the vehicle 30 is actually parked) (step S105). The positional deviation acquirer 250 then stores the obtained positional deviation information, as the past data associated with the automatic parking control (step S106).

Second Stop Control

Figure 7:
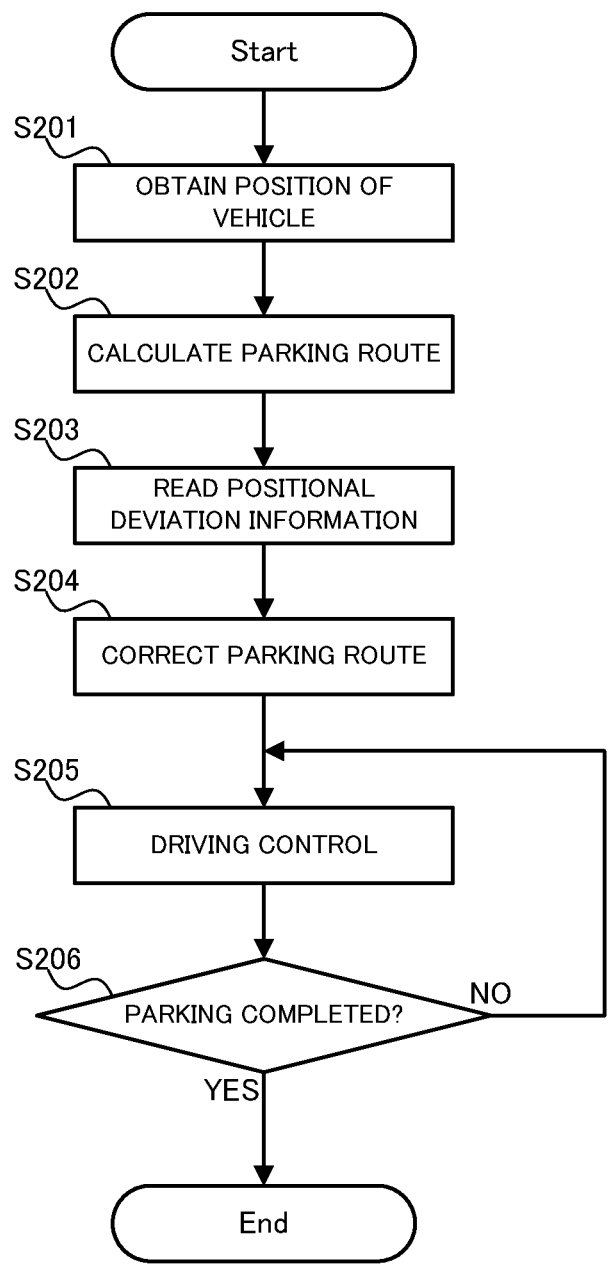
FIG. 7 is a flowchart illustrating a flow of operations of a second stop control.

Next, the second stop control (i.e., the step S17 in FIG. 2) will be specifically explained with reference to FIG. 7. FIG. 7 is a flowchart illustrating a flow of operations of the second stop control.

As illustrated in FIG. 7, when the second stop control is started, the parking route calculator 240 firstly obtains the current position of the vehicle 30 estimated by the vehicle position estimator 220 (step S201). The parking route calculator 240 then calculates a parking route from the current position of the vehicle 30 to the target parking position (step S202). The parking route calculated by the parking route calculator 240 is outputted to the parking route corrector 260.

The parking route corrector 260 then reads the positional deviation information of the past, from the positional deviation acquirer 250 (step S203). The parking route corrector 260 then corrects the parking route calculated by the parking route calculator 240, on the basis of the read positional deviation information (step S204). Specifically, the parking route corrector 260 may correct the parking route so as to reduce the deviation of the position generated in the automatic parking control. The parking route corrector 260 may correct the parking route such that there is little or no deviation of the position generated in the automatic parking control.

If there are a plurality of past data (i.e., pieces of positional deviation information) that can be used to correct the parking route, the parking route corrector 260 may use one of them, or a plurality of pieces of information. If using one information, the parking route corrector 260 may select the latest data (i.e., data with the latest data of acquisition). Moreover, if using a plurality of pieces of past data, the parking route corrector 260 may weight and use each of the past data. Specifically, a heavier weight may be imposed on newer data, to be used for the correction.

The parking control executor 270 then controls the driving of the vehicle 30, on the basis of the parking route corrected by the parking route corrector 260 (step S205). By this, the vehicle 30 moves to the target parking position.

When the driving control of the vehicle 30 is started, the parking control executor 270 determines whether or not the parking of the vehicle 30 is completed (i.e., whether or not the vehicle 30 has reached the target parking position) (step S206). If the parking is not completed (the step S206: NO), the parking control executor 270 continues the driving control of the vehicle 30. On the other hand, if the parking is completed (the step S206: YES), the second stop control is ended.

Even in the second stop control, as in the first embodiment, the positional deviation information may be obtained and stored as the past data. In other words, if the parking of the vehicle 30 is completed (the step S206: YES), the same steps as the step S105 and the step S106 in the flowchart in FIG. 6 may be also performed. The past data stored at this time may be used in the second stop control after this.

Technical Effect

Next, a technical effect obtained by the vehicle control apparatus 20 according to the embodiment will be explained.

As explained in FIG. 1 to FIG. 7, according to the vehicle control apparatus 20 in the embodiment, the parking route of the automatic parking control is controlled by using the past data. It is thus possible to prevent the deviation of the position that can be generated when the parking is completed. Particularly in the embodiment, the past data about a vehicle having matching specific information, or the past data about the same parking frame or the same type of parking frame is used. It is thus possible to extremely effectively prevent the deviation of the position from being generated.

In the embodiment described above, an example of the automatic parking control is explained; however, it is also possible to apply not only the automatic parking control, but also any control that allows the vehicle 30 to be automatically stopped at a predetermined target position. Moreover, by storing the past data in the vehicle 30 or in a plurality of management or administrative servers of parking lots in a sharable manner, it is also possible to prevent the deviation of the position from being generated in the automatic parking control performed in a different parking lot (i.e., a parking that is different from the parking lot in which the positional deviation information is obtained).

Modified Example

Figure 8:
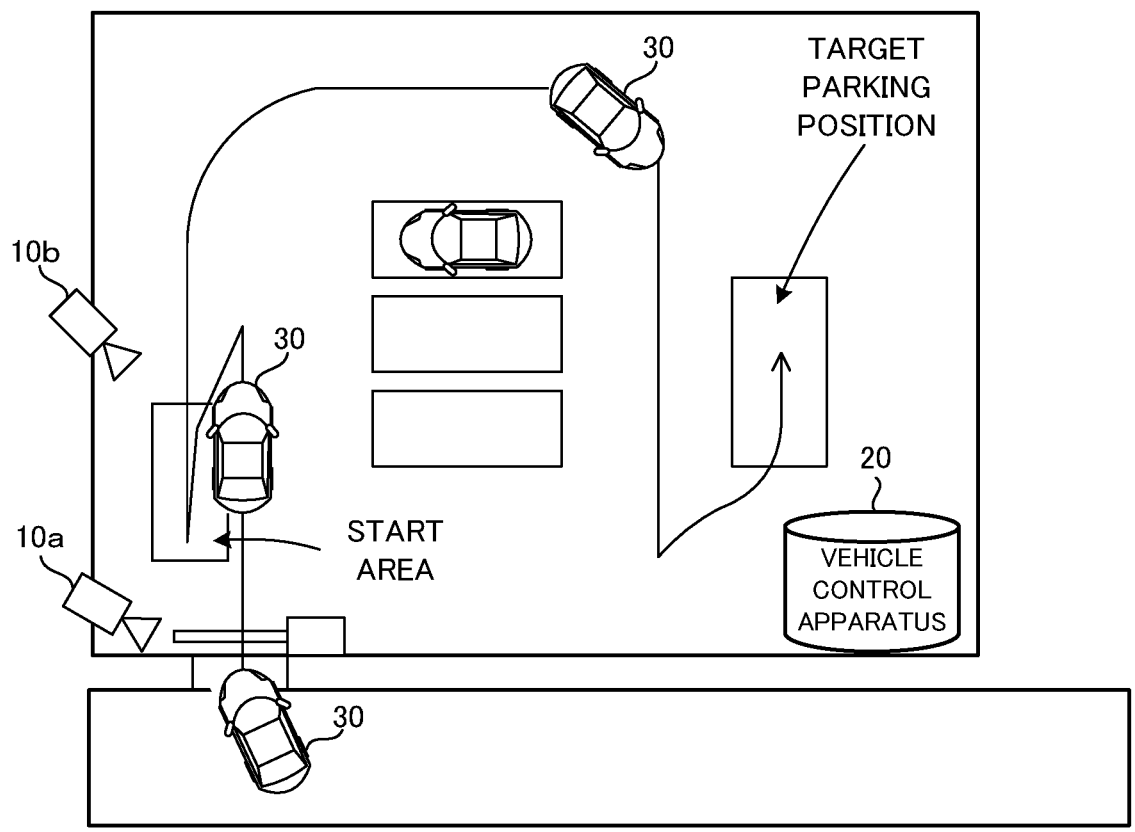
FIG. 8 is a plan view illustrating a specific example of operations of a vehicle control apparatus according to a modified example.

Next, a modified example of the vehicle control apparatus 20 will be explained with reference to FIG. 8. FIG. 8 is a plan view illustrating a specific example of operations of a vehicle control apparatus according to the modified example.

The vehicle control apparatus 20 described above can complete a process from the acquisition of the deviation of the position, to the correction of the parking route, which uses the deviation of the position, in one automatic parking control by the same vehicle. Specifically, a movement to a start area of the automatic parking control (i.e., an area set in advance as the start position of the automatic parking control) can be performed as the first stop control, and a subsequent movement from the start area to the target parking position can be performed as the second stop control.

As illustrated in FIG. 8, when the vehicle 30 enters a parking lot, individual identification information of the vehicle 30 is recognized by a camera 10a, which is the external recognition apparatus 10 placed near a gate of the parking lot, and it is determined whether or not the vehicle 30 is a vehicle on which the automatic parking control is to be performed (e.g., a vehicle that has a reservation of the automatic parking control). The vehicle 30 in which it is determined that the automatic parking control is to be performed, is then moved to the start area placed near an entrance of the parking lot. A movement of the vehicle 30 to the start area is typically performed by a driving operation by a driver of the vehicle 30, but if the vehicle 30 is not correctly accommodated in the start area or in similar cases, the vehicle 30 is automatically moved into the start area by the vehicle control apparatus 20. In other words, after the end of the driving operation by the driver, a position adjustment control to the start area is performed on the vehicle 30. This position adjustment control is performed to increase the precision/accuracy of the automatic parking control.

The vehicle control apparatus 20 according to the modified example is configured to perform the position adjustment control to the start area described above, as the first stop control (i.e., the stop control for accumulating the past data). Specifically, the vehicle control apparatus 20 may obtain a difference between a target stop position of the position adjustment control (i.e., a position of the start area) and a position at which the vehicle 30 is actually stopped after the position adjustment control, as the positional deviation information. The positional deviation information herein can be obtained by using a camera 10b, which is the external recognition apparatus 10 placed near the start area.

When the vehicle 30 is moved to the start area, the automatic parking control is performed by the vehicle control apparatus 20. In other words, the vehicle 30 is moved from the start area to the target parking position by automated or autonomous driving. The vehicle control apparatus 20 according to the modified example performs this automatic parking control as the second stop control (i.e., the stop control that uses the past data). Specifically, the vehicle control apparatus 20 may correct the parking route from the start area to the target parking position, on the basis of the positional deviation information obtained in the position adjustment control to the start area described above.

The position adjustment control to the start area and the automatic parking control from the start area are continuously performed on the same vehicle 30, and the deviation of the position generated in the position adjustment control is highly likely generated in the same manner in the automatic parking control. By using the positional deviation information in the position adjustment control, it is thus possible to effectively prevent the deviation of the position in the subsequent automatic parking control.

Supplementary Notes

Various aspects of embodiments of the present disclosure derived from the embodiment explained above will be explained hereinafter.

Supplementary Note 1

A vehicle control apparatus described in Supplementary Note 1 is a vehicle control apparatus configured to perform a stop control for stopping a vehicle at a target stop position to stop, the vehicle control apparatus provided with: a first executor configured to perform a first stop control as the stop control such that a first vehicle, which is the vehicle, is stopped at a first target stop position, which is the target stop position; a second executor configured to perform a second stop control as the stop control such that a second vehicle, which is the vehicle, is stopped at a second target stop position, which is the target stop position, after obtaining a difference between the first target stop position and a first actual stop position at which the vehicle is stopped in the first stop control; and a corrector configured to correct control contents of the second stop control on the basis of the difference, before the second vehicle is stopped at the second target stop position.

According to the vehicle control apparatus described in Supplementary Note 1, the control contents (e.g., a parking route, etc.) of the second stop control (i.e., the stop control for the second vehicle, which is performed after the first stop control) are corrected on the basis of the difference between the first target stop position and the first actual stop position in the first stop control (i.e., the stop control for the first vehicle). As described above, in view of the difference in the stop control performed in the past (i.e., a deviation of position), it is possible to reduce or eliminate a deviation of the stop position in the second stop control (i.e., a deviation between the second target stop position and an actually stopped position). Moreover, since a driving route in the second stop control or the stop target stop position is corrected before the second vehicle is stopped at the second target stop position, it is not necessary to change the position of the second vehicle again after the second vehicle is stopped.

Supplementary Note 2

In a vehicle control apparatus described in Supplementary Note 2, the corrector is configured to correct the control contents of the second stop control on the basis of the difference, when the first target stop position matches the second target stop position.

The deviation of the position in the stop control is likely repeatedly generated if the vehicle is stopped in the same place. It is thus possible to reduce the deviation of the stop position by correcting the control contents of the second stop control, when the first target stop position matches the second target stop position.

Supplementary Note 3

In a vehicle control apparatus described in Supplementary Note 3, the vehicle control apparatus is further provided with a specific information acquirer configured to obtain specific information of the first vehicle and specific information of the second vehicle, and the corrector is configured to correct the control contents of the second stop control on the basis of the difference, when the specific information of the first vehicle matches the specific information of the second vehicle.

The deviation of the position in the stop control is likely repeatedly generated in the same type of vehicle (e.g., a vehicle having the same vehicle type, the same size, or the same control system, etc.). It is thus possible to reduce the deviation of the stop position by correcting the control contents of the second stop control, when the specific information of the first vehicle matches the specific information of the second vehicle.

Supplementary Note 4

In a vehicle control apparatus described in Supplementary Note 4, the specific information is individual identification information of the vehicle.

The deviation of the position in the stop control is likely repeatedly generated in the same vehicle. It is thus possible to reduce the deviation of the stop position by correcting the control contents of the second stop control, in the case of a vehicle having matching individual identification information (in other words, in the case of the same vehicle).

Supplementary Note 5

In a vehicle control apparatus described in Supplementary Note 5, the vehicle control apparatus is further provided with a parking mode acquirer configured to obtain parking mode information including information about at least one of a direction of travel when the vehicle is stopped at the target stop position in the stop control and a direction of travel when the vehicle starts to drive from the target stop position after the stop control, and the corrector is configured to correct the control contents of the second stop control on the basis of the difference, when the parking mode information in the first stop control matches the parking mode information in the second stop control.

The deviation of the position in the stop control is likely repeatedly generated when a similar control (which is particularly a control that allows the same direction of travel during the stop control or after the stop control) is performed. It is thus possible to reduce the deviation of the stop position by correcting the control contents of the second stop control, when the parking mode information in the first stop control matches the parking mode information in the second stop control.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle control apparatus configured to perform a stop control for stopping a vehicle at a target stop position to stop, said vehicle control apparatus comprising:
    a processor for executing programs stored in memory including a first executor, a second executor, and a corrector, the processor configured to:
    perform, with the first executor, a first stop control as the stop control such that a first vehicle, which is the vehicle, is stopped at a first target stop position, which is the target stop position;
    perform, with the second executor, a second stop control as the stop control such that a second vehicle, which is the vehicle, is stopped at a second target stop position, which is the target stop position, after obtaining a difference between the first target stop position and a first actual stop position at which the vehicle is stopped in the first stop control; and
    correct, with the corrector, control contents of the second stop control on the basis of the difference, before the second vehicle is stopped at the second target stop position,
    wherein said processor further comprises a specific information acquirer, the processor further configured to, with the specific information acquirer, obtain specific information of the first vehicle and specific information of the second vehicle,
    wherein said processor is configured to correct, with the corrector, the control contents of the second stop control on the basis of the difference, when the specific information of the first vehicle matches the specific information of the second vehicle, and
    wherein the specific information is individual identification information of the vehicle.

2. The vehicle control apparatus according to claim 1, wherein said processor is configured to, with the corrector, correct the control contents of the second stop control on the basis of the difference, when the first target stop position matches the second target stop position.

3. A vehicle control apparatus configured to perform a stop control for stopping a vehicle at a target stop position to stop, said vehicle control apparatus comprising:
    a processor for executing programs stored in memory including a first executor, a second executor, and a corrector, the processor configured to:
    perform, with the first executor, a first stop control as the stop control such that a first vehicle, which is the vehicle, is stopped at a first target stop position, which is the target stop position;
    perform, with the second executor, a second stop control as the stop control such that a second vehicle, which is the vehicle, is stopped at a second target stop position, which is the target stop position, after obtaining a difference between the first target stop position and a first actual stop position at which the vehicle is stopped in the first stop control; and
    correct, with the corrector, control contents of the second stop control on the basis of the difference, before the second vehicle is stopped at the second target stop position,
    wherein said processor further comprises a parking mode acquirer, the processor configured to, with the parking mode acquirer, obtain parking mode information including information about at least one of a direction of travel when the vehicle is stopped at the target stop position in the stop control and a direction of travel when the vehicle starts to drive from the target stop position after the stop control, and
wherein said processor is configured to, with said corrector, correct the control contents of the second stop control on the basis of the difference, when the parking mode information in the first stop control matches the parking mode information in the second stop control.

* * * * *